(12) United States Patent
Seeler et al.

(10) Patent No.: US 9,318,245 B2
(45) Date of Patent: Apr. 19, 2016

(54) HEAT CARRIER MEDIUM FOR MAGNETOCALORIC MATERIALS

(71) Applicant: BASF SE, Ludwigshafen (DE)

(72) Inventors: Fabian Seeler, Dossenheim (DE); Georg Degen, Lorsch (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/574,633

(22) Filed: Dec. 18, 2014

(65) Prior Publication Data
US 2015/0123025 A1 May 7, 2015

Related U.S. Application Data

(62) Division of application No. 13/263,811, filed as application No. PCT/EP2010/054266 on Mar. 31, 2010, now Pat. No. 8,945,417.

(30) Foreign Application Priority Data

Apr. 8, 2009 (EP) .................................... 09157608

(51) Int. Cl.
| C09K 5/14 | (2006.01) |
| H01F 1/01 | (2006.01) |
| C09K 5/10 | (2006.01) |

(52) U.S. Cl.
CPC *H01F 1/015* (2013.01); *C09K 5/10* (2013.01); *H01F 1/017* (2013.01)

(58) Field of Classification Search
CPC ...... C09K 5/14; C09K 5/08; C09K 2205/102; C09K 2205/10; H01F 1/012; H01F 1/107
USPC ............... 252/74, 62.55, 62.51 R, 67, 68, 69; 148/306, 307, 314; 62/3.1
See application file for complete search history.

(56) References Cited

U.S. PATENT DOCUMENTS

| 4,338,209 | A | 7/1982 | Manabe et al. | |
|---|---|---|---|---|
| 5,641,424 | A | 6/1997 | Ziolo et al. | |
| 6,826,915 | B2 | 12/2004 | Wada et al. | |
| 7,168,255 | B2 | 1/2007 | Saito et al. | |
| 8,427,030 | B2 * | 4/2013 | Degen | H01L 37/04 310/306 |
| 8,763,407 | B2 * | 7/2014 | Carroll | F25B 21/00 62/3.1 |
| 8,769,965 | B2 * | 7/2014 | Tsuji | C09K 5/14 252/62.57 |
| 8,945,417 | B2 * | 2/2015 | Seeler | C09K 5/10 252/62.55 |
| 2006/0117758 | A1 | 6/2006 | Bruck et al. | |
| 2006/0218936 | A1 * | 10/2006 | Kobayashi | F25B 21/00 62/3.1 |
| 2007/0220901 | A1 * | 9/2007 | Kobayashi | B22F 1/02 62/3.1 |
| 2010/0077752 | A1 * | 4/2010 | Papile | B01D 53/08 60/641.8 |
| 2011/0037342 | A1 | 2/2011 | Degen et al. | |
| 2011/0094243 | A1 * | 4/2011 | Carroll | F25B 21/00 62/3.1 |
| 2012/0033002 | A1 | 2/2012 | Seeler et al. | |
| 2012/0222428 | A1 | 9/2012 | Celik et al. | |
| 2013/0269367 | A1 * | 10/2013 | Meillan | A01J 9/04 62/3.1 |
| 2014/0202171 | A1 * | 7/2014 | Carroll | H01F 1/015 62/3.1 |
| 2015/0033763 | A1 * | 2/2015 | Saito | F25B 21/00 62/3.1 |
| 2015/0047371 | A1 * | 2/2015 | Hu | H01F 1/015 62/3.1 |
| 2015/0068219 | A1 * | 3/2015 | Komorowski | F25B 21/00 62/3.1 |

FOREIGN PATENT DOCUMENTS

| DE | 102006046041 A1 | 4/2008 | | |
|---|---|---|---|---|
| JP | 2005226125 A | 8/2005 | | |
| JP | 2006124783 A | 5/2006 | | |
| JP | 2008150695 A | 7/2008 | | |
| WO | WO-2004068512 A1 | 8/2004 | | |
| WO | WO-2006/074790 A1 | 7/2006 | | |
| WO | WO 2009090442 A1 * | 7/2009 | ............. | F25B 21/00 |
| WO | WO 2009133047 A2 * | 11/2009 | ............. | H01L 37/04 |

OTHER PUBLICATIONS

International Preliminary Report on Patentability dated Oct. 27, 2011, in International Application No. PCT/EP2010/054266.
Brück, E., et al., "Magnetic refrigeration—towards room-temperature applications," Physica B (2003), vol. 327, pp. 431-437.
Canepa, F., et al., "Ageing effect on the magnetocaloric properties of Gd, $Gd_5Si_{1.9}Ge_{2.1}$ and on the eutectic composition $Gd_{75}Cd_{25}$," J. Phys. d: Appl. Phys. (2008), vol. 41, 10 pages.
Liu, M., et al., "Development of magnetocaloric materials in room temperature magnetic refrigeration application in recent six years," J. Cent. South Univ. Technol. (2009), vol. 16, pp. 0001-0012.
Tegus, O., et al., "Transition-metal-based magnetic materials in room temperature magnetic refrigeration application in recent six years," Nature (Jan. 10, 2002), vol. 415, pp. 150-152.
Thanh, D.T.C., et al., "Magnetocaloric effect in MnFe(P, Si, Ge) compounds," Journal of Applied Physics (2006), vol. 99, pp. 08Q107-08Q107-3.
Wang, Z., et al., "Structural stability of single-layered $LaNi_{4.25}Al_{0.75}$ film and its electrochemical hydrogen-storage properties," Rare Metals (Oct. 2006), vol. 25, No. 5, pp. 543-548.
English Translation of Taiwan Office Action dated Dec. 3, 2014 in Patent Application No. 099109706.

* cited by examiner

*Primary Examiner* — Douglas McGinty
(74) *Attorney, Agent, or Firm* — Drinker Biddle & Reath LLP

(57) ABSTRACT

What is described is the use of alcohols, alcoholamines, diols, polyols or mixtures thereof in heat carrier media or as heat carrier media which are in contact with magnetocaloric materials.

9 Claims, No Drawings

HEAT CARRIER MEDIUM FOR MAGNETOCALORIC MATERIALS

CROSS-REFERENCE TO RELATED APPLICATIONS

This application is a divisional application of U.S. Ser. No. 13/263,811 filed on Oct. 10, 2011, now U.S. Pat. No. 8,945,417, which was a national stage application (under 35 U.S.C. §371) of PCT/EP2010/054266, filed Mar. 31, 2010, which claims benefit of EP 09157608.2, filed Apr. 8, 2009, all applications of which are incorporated by reference herein in their entirety.

The invention relates to the use of corrosion-stabilizing additives in heat carrier media or as heat carrier media which are in contact with magnetocaloric materials, to corresponding heat carrier media and to magnetic coolers, magnetic heat pumps or magnetic generators comprising them.

BACKGROUND OF THE INVENTION

Magnetocaloric materials, also referred to as thermomagnetic materials, can be used in magnetic cooling, in heat pumps or air conditioning systems, and generators.

Such materials are known in principle and are described, for example, in WO 2004/068512. Magnetic cooling techniques are based on the magnetocaloric effect (MCE) and may constitute an alternative to the known vapor circulation cooling methods. In a material which exhibits a magnetocaloric effect, the alignment of randomly aligned magnetic moments by an external magnetic field leads to heating of the material. This heat can be removed from the MCE material to the surrounding atmosphere by a heat transfer. When the magnetic field is then switched off or removed, the magnetic moments revert back to a random arrangement, which leads to cooling of the material below ambient temperature. This effect can be exploited for cooling purposes; see also Nature, Vol. 415, Jan. 10, 2002, pages 150 to 152. Typically, a heat transfer medium such as water is used for heat removal from the magnetocaloric material.

Customary materials are prepared by solid phase reaction of the starting elements or starting alloys for the material in a ball mill, subsequent pressing, sintering and heat treatment under inert gas atmosphere and subsequent slow cooling to room temperature. Processing by means of melt spinning is also possible. This makes possible a more homogeneous element distribution, which leads to an improved magnetocaloric effect.

A problem in the case of use of the heat exchange medium or heat transfer media is the corrosion tendency of the magnetocaloric materials. Attempts are being made in different ways to prevent this corrosion. Corrosion is also referred to as fouling or leaching.

Specifically the washout of toxic metals such as arsenic or manganese is problematic. In general, the application properties of the magnetocaloric materials suffer as a result of corrosion, fouling or leaching.

US 2007/0220901 describes providing an oxidation-resistant film on the surface of the magnetic material particles. This film is especially aluminum oxide or aluminum nitride.

JP-A-2006-124783 describes the coating of the magnetic particles with a chemical film based on phosphoric acid for corrosion protection.

JP-A-2005-226125 describes metal plating for coating of magnetic particles, the intention being that ion plating with a corrosion-resistant metal should improve the corrosion protection.

These methods envisage complex further treatment of the magnetocaloric materials.

BRIEF SUMMARY OF THE INVENTION

It is an object of the present invention to provide anticorrosives for magnetocaloric materials which avoid coating of the magnetocaloric materials and can also be integrated in a simple manner into already existing magnetic coolers, magnetic heat pumps or magnetic generators.

The object is achieved in accordance with the invention by use of preferably water-miscible alcohols, alcoholamines, diols, polyols or mixtures thereof in preferably aqueous heat carrier media or as heat carrier media which are in contact with magnetocaloric materials. The alcohols, diols, polyols or mixtures thereof serve as an anticorrosive for prevention of corrosion of the magnetocaloric materials.

It has been found in accordance with the invention that the corrosion of the magnetocaloric materials can be greatly reduced when alcohols, alcoholamines, diols or polyols are used as heat carrier media or in preferably aqueous heat carrier media.

In addition, the object is achieved in accordance with the invention by use of aqueous liquids which have a pH of at least 8 at 25° C. as a heat carrier medium which is in contact with magnetocaloric materials.

DETAILED DESCRIPTION OF THE INVENTION

It has been found in accordance with the invention that, at basic pH values, the corrosion of the magnetocaloric materials can be greatly reduced. Particularly good effects are achieved when aqueous heat carrier media which comprise alcohols, diols, polyols or mixtures thereof and simultaneously have a pH of at least 8 are used.

The pH in the aqueous liquids is preferably at least 10, more preferably at least 12, especially 12 to 14, at 25° C.

The water miscibility of the alcohols, alcoholamines, diols and polyols must, in the case of additional use of water as a heat carrier medium, be sufficiently great as to give rise to a homogeneous mixture or solution at the desired mixing ratio with water. If only small amounts of alcohol should be envisaged, it is possible to switch to lower water miscibility alcohols. At high alcohol contents, a good water miscibility should be ensured.

The alcohols used are preferably $C_{1-6}$-alkanols, more preferably methanol, ethanol, n-propanol, 2-propanol or mixtures thereof.

Preferred alcoholamines are $C_{1-6}$-alkanolamines, especially ethanolamine.

The diols used are preferably $C_{2-6}$-alkanediols, especially ethylene glycol, propylene glycol, butanediol or mixtures thereof.

Particularly preferred polyols have an aliphatic hydrocarbon radical having 3 to 6 hydroxyl groups.

Particular preference is given to using ethanol and glycol.

The alcohols, alcoholamines, diols, polyols or mixtures thereof may be used as the sole heat carrier media or be introduced in any suitable amounts into aqueous heat carrier media. The content in the aqueous heat carrier media of alcohols, alcoholamines, diols, or polyols or mixtures thereof is preferably 10 to 90% by weight, more preferably 10 to 70% by weight, especially 20 to 50% by weight.

According to the invention, particular preference is given to using aqueous heat carrier media with a content of $C_{1-3}$-alkanoles or $C_{2-4}$-alkanediols in the range from 10 to 90% by weight, or the pure alkanols or diols.

The magnetocaloric materials are preferably part of a magnetic cooler, of a magnetic heat pump or of a magnetic generator. For a description of customary magnetic coolers, magnetic heat pumps or magnetic generators, reference may be made to the literature mentioned at the outset. In addition, WO 2006/074790 can be cited for a description of a magnetic regenerator.

According to the invention, it is possible to use any desired magnetocaloric materials.

Typical magnetocaloric materials are muitimetal materials which often comprise at least three metallic elements and additionally optionally nonmetallic elements. The expression "metal-based materials" or "magnetocaloric materials" indicates that the predominant proportion of these materials is formed from metals or metallic elements.

Typically, the proportion in the overall material is at least 50% by weight, preferably at least 75% by weight, especially at least 80% by weight. Suitable metal-based materials are explained in detail below.

The magnetocaloric material is more preferably selected from
(1) compounds of the general formula (I)

$$(A_yB_{y-1})_{2+\delta}C_wD_xE_z \qquad (I)$$

where
A is Mn or Co,
B is Fe, Cr or Ni,
C, D and E at least two of C, D and E are different, have a non-vanishing concentration and are selected from P, B, Se, Ge, Ga, Si, Sn, N, As and Sb, where at least one of C, D and E is Ge, As or Si,
$\delta$ is a number in the range from −0.1 to 0.1,
w, x, y, z are numbers in the range from 0 to 1, where w+x+z=1;
(2) La- and Fe-based compounds of the general formulae (II) and/or (III) and/or (IV)

$$Le(Fe_xAl_{1-x})_{13}H_y \text{ or } La(Fe_xSi_{1-x})_{13}H_y \qquad (II)$$

where
x is a number from 0.7 to 0.95,
y is a number from 0 to 3, preferably from 0 to 2;

$$La(Fe_xAl_yCo_z)_{13} \text{ or } La(Fe_xSi_yCo_z)_{13} \qquad (III)$$

where
x is a number from 0.7 to 0.95,
y is a number from 0.05 to 1−x,
z is a number from 0.005 to 0.5;

$$LaMn_xFe_{2-x}Ge \qquad (IV)$$

where
x is a number from 1.7 to 1.95 and
(3) Heusler alloys of the MnTP type where T is a transition metal and P is a p-doping metal having an electron count per atom e/a in the range from 7 to 8.5.

Materials particularly suitable in accordance with the invention are described, for example, in WO 2004/068512, Rare Metals, Vol. 25, 2006, pages 544 to 549, J. Appl. Phys. 99,08Q107 (2006), Nature, Vol. 415, Jan. 10, 2002, pages 150 to 152 and Physica B 327 (2003), pages 431 to 437.

In the aforementioned compounds of the general formula (I), C, D and E are preferably identical or different and are selected from at least one of P, Ge, Si, Sn, As and Ga.

The metal-based material of the general formula (I) is preferably selected from at least quaternary compounds which, as well as Mn, Fe, P and if appropriate Sb, additionally comprise Ge or Si or As or Ge and Si or Ge and As or Si and As, or Ge, Si and As.

Preferably at least 90% by weight, more preferably at least 95% by weight, of component A is Mn. More preferably at least 90% by weight, more preferably at least 95% by weight, of B is Fe. Preferably at least 90% by weight, more preferably at least 95% by weight, of C is P. Preferably at least 90% by weight, more preferably at least 95% by weight, of D is Ge. Preferably at least 90% by weight, more preferably at least 95% by weight, of E is Si.

The material preferably has the general formula $MnFe(P_wGe_xSi_z)$.

x is preferably a number in the range from 0.3 to 0.7, w is less than or equal to 1−x and z corresponds to 1−x−w.

The material preferably has the crystalline hexagonal $Fe_2P$ structure. Examples of suitable structures are $MnFeP_{0.45 \text{ to } 0.7}$, $Ge_{0.55 \text{ to } 0.30}$ and $MnFeP_{0.5 \text{ to } 0.70}$, $(Si/Ge)_{0.5 \text{ to } 0.30}$.

Suitable compounds are additionally $M_{n1+x}Fe_{1-x}P_{1-y}Ge_y$ with x in the range from −0.3 to 0.5, y in the range from 0.1 to 0.6. As may also be present in place of Ge. Likewise suitable are compounds of the general formula $Mn_{1+x}Fe_{1-x}P_{1-y}Ge_{y-z}Sb_z$ with x in the range from −0.3 to 0.5, y in the range from 0.1 to 0.6 and z less than y and less than 0.2. Also suitable are compounds of the formula $Mn_{1+x}Fe_{1-x}P_{1-y}Ge_{y-z}Si_z$ with x in the range from 0.3 to 0.5, y in the range from 0.1 to 0.66, z less than or equal to y and less than 0.6.

Also advantageous are compounds of the $Mn_xFe_{2-x}P_yAs_{1-y}$ type where x=0.7 to 1.3 and y=0.3 to 0.7.

Preferred La- and Fe-based compounds of the general formulae (II) and/or (III) and/or (IV) are $La(Fe_{0.90}Si_{0.10})_{13}$, $La(Fe_{0.89}Si_{0.11})_{13}$, $La(Fe_{0.880}Si_{0.120})_{13}$, $La(Fe_{0.877}Si_{0.123})_{13}$, $LaFe_{11.8}Si_{1.2}$, $La(Fe_{0.88}Si_{0.12})_{13}H_{0.5}$, $La(Fe_{0.88}Si_{0.12})_{13}H_{1.0}$, $LaFe_{11.7}Si_{1.3}H_{1.1}$, $LaFe_{11.57}Si_{1.43}H_{1.3}$, $La(Fe_{0.88}Si_{0.12})H_{1.5}$, $LaFe_{11.2}Co_{0.7}Si_{1.1}$, $LaFe_{11.5}Al_{1.5}C_{0.1}$, $LaFe_{11.5}Al_{1.5}C_{0.2}$, $LaFe_{11.5}Al_{1.5}C_{0.4}$, $LaFe_{11.5}Al_{1.5}Co_{0.5}$, $La(Fe_{0.94}Co_{0.06})_{11.83}Al_{1.17}$, $La(Fe_{0.92}Co_{0.08})_{11.83}Al_{1.17}$.

Suitable manganese-comprising compounds are MnFeGe, $MnFe_{0.9}Co_{0.1}Ge$, $MnFe_{0.8}Co_{0.2}Ge$, $MnFe_{0.7}Co_{0.03}Ge$, $MnFe_{0.6}Co_{0.4}Ge$, $MnFe_{0.5}Co_{0.5}Ge$, $MnFe_{0.4}Co_{0.5}Ge$, $MnFe_{0.3}Co_{0.7}Ge$, $MnFe_{0.2}Co_{0.8}Ge$, $MnFe_{0.15}Co_{0.85}Ge$, $MnFe_{0.1}Co_{0.9}Ge$, MnCoGe, $Mn_5Ge_{2.5}Si_{0.5}$, $Mn_5Ge_2Si$, $Mn_5Ge_{1.5}Si_{1.5}$, $Mn_5GeSi_2$, $Mn_5Ge_3$, $Mn_5Ge_{2.9}Sb_{0.1}$, $Mn_5Ge_{2.8}Sb_{0.2}$, $Mn_5Ge_{2.7}Sb_{0.3}$, $LaMn_{1.9}Fe_{0.1}Ge$, $LaMn_{1.85}Fe_{0.15}Ge$, $LaMn_{1.8}Fe_{0.2}Ge$, $(Fe_{0.9}Mn_{0.1})_3C$, $(Fe_{0.8}Mn_{0.2})_3C$, $(Fe_{0.7}Mn_{0.3})_3C$, $Mn_3GaC$, MnAs, (Mn,Fe)As, $Mn_{1+\delta}As_{0.8}Sb_{0.2}$, $MnAs_{0.75}Sb_{0.25}$, $Mn_{1.1}As_{0.75}Sb_{0.25}$, $Mn_{1.5}As_{0.75}Sb_{0.25}$.

Heusler alloys suitable in accordance with the invention are, for example, $Fe_2MnSi_{0.5}Ge_{0.5}$, $Ni_{52.9}Mn_{22.4}Ga_{24.7}$, $Ni_{50.9}Mn_{24.7}Ga_{24.4}$, $Ni_{55.2}Mn_{18.6}Ga_{26.2}$, $Ni_{51.6}Mn_{24.7}Ga_{23.8}$, $Ni_{52.7}Mn_{23.9}Ga_{23.4}$, CoMnSb, $CoNb_{0.2}Mn_{0.8}Sb$, $CoNb_{0.4}Mn_{0.6}Sb$, $CoNb_{0.6}Mn_{0.4}Sb$, $Ni_{50}Mn_{35}Sn_{15}$, $Ni_{50}Mn_{37}Sn_{13}$, $MnFeP_{0.45}As_{0.55}$, $MnFeP_{0.47}As_{0.53}$, $Mn_{1.1}Fe_{0.9}P_{0.47}As_{0.53}$, $MnFeP_{0.89-x}Si_xGe_{0.11}$, X=0.22, X=0.26, X=0.30, X=0.33.

The average crystal size is frequently in the range from 10 to 400 nm, more preferably 20 to 200 nm, especially 30 to 80 nm. The average crystal size can be determined by X-ray diffraction. When the crystal size becomes too small, the maximum magnetocaloric effect is reduced. When the crystal size, in contrast, is too large, the hysteresis of the system rises.

The inventive metal-based materials are preferably used in magnetic cooling as described above. A corresponding refrigerator has, in addition to a magnet, preferably a permanent magnet, metal-based materials as described above. The cooling of computer chips and solar power generators is also possible. Further fields of application are heat pumps and air conditioning systems.

The metal-based materials prepared by the process according to the invention may have any desired solid form. They may be present, for example, in the form of flakes, ribbons, wires, powder, or else in the form of shaped bodies. Shaped bodies such as monoliths or honeycombs can be produced, for example, by a hot extrusion process. It is possible, for example, for cell densities of 400 to 1600 CPI or more to be present. Thin sheets obtainable by rolling processes are also preferred in accordance with the invention. Advantageous nonporous shaped bodies are those composed of shaped thin material, for example tubes, plates, meshes, grids or rods. Shaping by metal injection molding (MIM) processes is also possible in accordance with the invention.

The preparation of the metal-based materials for the magnetic cooling or heat pumps or generators may comprise the following steps:

a) reacting chemical elements and/or alloys in a stoichiometry which corresponds to the metal-based material in the solid and/or liquid phase,
b) if appropriate converting the reaction product from stage a) to a solid,
c) sintering and/or heat treating the solid from stage a) or b),
d) quenching the sintered and/or heat-treated solid from stage c) at a cooling rate of at least 100 K/s.

The thermal hysteresis can be reduced significantly when the metal-based materials are not cooled slowly to ambient temperature after the sintering and/or heat treatment, but rather are quenched at a high cooling rate. This cooling rate is at least 100 K/s. The cooling rate is preferably from 100 to 10 000 K/s, more preferably from 200 to 1300 K/s. Especially preferred cooling rates are from 300 to 1000 K/s.

The quenching can be achieved by any suitable cooling processes, for example by quenching the solid with water or aqueous liquids, for example cooled water or ice/water mixtures. The solids can, for example, be allowed to fall into ice-cooled water. It is also possible to quench the solids with subcooled gases such as liquid nitrogen. Further processes for quenching are known to those skilled in the art. What is advantageous here is controlled and rapid cooling.

Without being bound to a theory, the reduced hysteresis can be attributed to smaller particle sizes for the quenched compositions.

In alternative processes, the sintering and heat treatment are each followed by slow cooling, which leads to the formation of larger particle sizes and hence to an increase in thermal hysteresis.

In step (a) of the process, the elements and/or alloys which are present in the later metal-based material are converted in a stoichiometry which corresponds to the metal-based material in the solid or liquid phase.

Preference is given to performing the reaction in stage a) by combined heating of the elements and/or alloys in a closed vessel or in an extruder, or by solid phase reaction in a ball mill. Particular preference is given to performing a solid phase reaction, which is effected especially in a ball mill. Such a reaction is known in principle; cf. the documents cited by way of introduction. Typically, powders of the individual elements or powders of alloys of two or more of the individual elements which are present in the later metal-based material are mixed in pulverulent form in suitable proportions by weight. If necessary, the mixture can additionally be ground in order to obtain a microcrystalline powder mixture. This powder mixture is preferably heated in a ball mill, which leads to further comminution and also good mixing, and to a solid phase reaction in the powder mixture.

Alternatively, the individual elements are mixed as a powder in the selected stoichiometry and then melted.

The combined heating in a closed vessel allows the fixing of volatile elements and control of the stoichiometry. Specifically in the case of use of phosphorus, this would evaporate easily in an open system.

The reaction is followed by sintering and/or heat treatment of the solid, for which one or more intermediate steps can be provided. For example, the solid obtained in stage a) can be pressed before it is sintered and/or heat treated. This allows the density of the material to be increased, such that a high density of the magnetocaloric material is present in the later application. This is advantageous especially because the volume within which the magnetic field exists can be reduced, which may be associated with considerable cost savings. Pressing is known per se and can be carried out with or without pressing aids. It is possible to use any suitable mold for pressing. By virtue of the pressing, it is already possible to obtain shaped bodies in the desired three-dimensional structure. The pressing may be followed by the sintering and/or heat treatment of stage c), followed by the quenching of stage d).

Alternatively, it is possible to send the solid obtained from the ball mill to a melt-spinning process. Melt-spinning processes are known per se and are described, for example, in Rare Metals, Vol. 25, October 2006, pages 544 to 549, and also in WO 2004/068512.

In these processes, the composition obtained in stage a) is melted and sprayed onto a rotating cold metal roller. This spraying can be achieved by means of elevated pressure upstream of the spray nozzle or reduced pressure downstream of the spray nozzle. Typically, a rotating copper drum or roller is used, which can additionally be cooled if appropriate. The copper drum preferably rotates at a surface speed of from 10 to 40 m/s, especially from 20 to 30 m/s. On the copper drum, the liquid composition is cooled at a rate of preferably from $10^2$ to $10^7$ K/s, more preferably at a rate of at least $10^4$ K/s, especially with a rate of from 0.5 to $2 \times 10^6$ K/s.

The melt-spinning, like the reaction in stage a) too, can be performed under reduced pressure or under an inert gas atmosphere.

The melt-spinning achieves a high processing rate, since the subsequent sintering and heat treatment can be shortened. Specifically on the industrial scale, the production of the metal-based materials thus becomes significantly more economically viable. Spray-drying also leads to a high processing rate. Particular preference is given to performing melt spinning.

Alternatively, in stage b), spray cooling can be carried out, in which a melt of the composition from stage a) is sprayed into a spray tower. The spray tower may, for example, additionally be cooled. In spray towers, cooling rates in the range from $10^3$ to $10^5$ K/s, especially about $10^4$ K/s, are frequently achieved.

The sintering and/or heat treatment of the solid is effected in stage c) preferably first at a temperature in the range from 800 to 1400° C. for sintering and then at a temperature in the range from 500 to 750° C. for heat treatment. These values apply especially to shaped bodies, while lower sintering and heat treatment temperatures can be employed for powders. For example, the sintering can then be effected at a temperature in the range from 500 to 800° C. For shaped bodies/solids, the sintering is more preferably effected at a temperature in the range from 1000 to 1300° C., especially from 1100 to 1300° C. The heat treatment can then be effected, for example, at from 600 to 700° C.

The sintering is performed preferably for a period of from 1 to 50 hours, more preferably from 2 to 20 hours, especially from 5 to 15 hours. The heat treatment is performed preferably for a period in the range from 10 to 100 hours, more preferably from 10 to 60 hours, especially from 30 to 50 hours. The exact periods can be adjusted to the practical requirements according to the materials.

In the case of use of the melt-spinning process, it is frequently possible to dispense with sintering, and the heat treatment can be shortened significantly, for example to periods of from 5 minutes to 5 hours, preferably from 10 minutes to 1 hour. Compared to the otherwise customary values of 10 hours for sintering and 50 hours for heat treatment, this results in a major time advantage.

The sintering/heat treatment results in partial melting of the particle boundaries, such that the material is compacted further.

The melting and rapid cooling in stage b) thus allows the duration of stage c) to be reduced considerably. This also allows continuous production of the metal-based materials.

Particular preference is given to the process sequence of
a) solid phase reaction of chemical elements and/or alloys in a stoichiometry which corresponds to the metal-based material in a ball mill,
b) melt spinning the material obtained in stage a),
c) heat treating the solid from stage b) at a temperature in the range from 430 to 1200° C., preferably from 800 to 1000° C., for a period of from 10 seconds or 1 minute to 5 hours, preferably from 30 minutes to 2 hours,
d) quenching the heat treated solid from stage c) at a cooling rate of from 200 to 1300 K/s.

The invention also relates to a heat carrier medium for magnetic coolers, magnetic heat pumps, magnetic generators, comprising preferably water-miscible alcohols, alcoholamines, diols, polyols or mixtures thereof.

The invention also relates to magnetic coolers, magnetic heat pumps or magnetic generators, comprising at least one magnetocaloric material and a heat carrier medium, wherein the heat carrier medium comprises water-miscible alcohols, alcoholamines, diols, polyols or mixtures thereof, or consists thereof, and/or has a pH of at least 8.

The heat carrier medium preferably comprises 50 to 90% by weight of water, more preferably 60 to 80% by weight of water.

The heat carrier medium may also comprise further customary ingredients, for example corrosion inhibitors, viscosity modifiers, biocides, etc.

The invention is illustrated in detail by the examples which follow.

EXAMPLES

The magnetocaloric material used was pulverulent MnFeP$_{0.5}$As$_{0.5}$.

Example 1

10 g of the pulverulent material were stirred in 100 ml of dist. water for two weeks. An analysis shows that approx. 2% of the arsenic present in the compound was dissolved.

Example 2

10 g of the pulverulent material was stirred in 100 ml of water with pH=11, which has been established with NaOH, for two weeks. An analysis shows that less than 0.12% of the arsenic present in the compound was dissolved.

Example 3

10 g of the pulverulent material were stirred in a mixture of ethanol and water (1:1) for two weeks. An analysis shows that approx. 0.3% of the arsenic present in the compound was dissolved.

The invention claimed is:

1. A composition comprising an aqueous heat carrier medium for magnetic coolers, magnetic heat pumps and magnetic generators, the aqueous heat carrier medium comprising 10 to 70% by weight of water miscible alcohols, diols, polyols or mixtures thereof and having a pH of at least 8, in contact with a magnetocaloric material,
wherein the magnetocaloric material is a compound selected from the group consisting of La(Fe$_x$Al$_{1-x}$)$_{13}$H$_y$ and La(Fe$_x$Si$_{1-x}$)$_{13}$H$_y$ wherein x is a number from 0.7 to 0.95, and y is a number from 0 to 3.

2. The composition according to claim 1, wherein the aqueous heat carrier medium includes an alcohol selected from the group consisting of methanol, ethanol, n-propanol and 2-propanol.

3. The composition according to claim 1, wherein the aqueous heat carrier medium includes a diol selected from group consisting of ethylene glycol, propylene glycol and butanediol.

4. The composition according to claim 1, wherein the magnetocaloric material is part of a magnetic cooler, of a magnetic heat pump or of a magnetic generator.

5. The composition according to claim 1, wherein the magnetocaloric material is selected from the group consisting of La(Fe$_{0.90}$Si$_{0.10}$)$_{13}$, La(Fe$_{0.89}$Si$_{0.11}$)$_{13}$, La(Fe$_{0.88}$Si$_{0.12}$)$_{13}$, La(Fe$_{0.877}$Si$_{0.123}$)$_{13}$, LaFe$_{11.8}$Si$_{1.2}$, La(Fe$_{0.88}$Si$_{0.12}$)$_{13}$H$_{0.5}$, La(Fe$_{0.88}$Si$_{0.12}$)$_{13}$H$_{1.0}$, LaFe$_{11.7}$Si$_{1.3}$H$_{1.1}$, LaFe$_{11.57}$Si$_{1.43}$H$_{1.3}$.

6. The composition according to claim 1, wherein the aqueous heat carrier medium comprises 60% to 80% water.

7. A method for producing the composition according to claim 1, the method comprising contacting the water miscible alcohols, the diols, the polyols or the mixtures thereof with the magnetocaloric material.

8. A magnetic cooler, magnetic heat pump or magnetic generator, comprising the composition according to claim 1.

9. A composition comprising an aqueous heat carrier medium for magnetic coolers, magnetic heat pumps and magnetic generators, the aqueous heat carrier medium comprising 10 to 70% by weight of water miscible alcohols, diols, polyols or mixtures thereof and having a pH of at least 8, in contact with a magnetocaloric material,
wherein the magnetocaloric material is a compound selected from the group consisting of:

La(Fe$_x$Al$_y$Co$_z$)$_{13}$ or La(Fe$_x$Si$_y$Co$_z$)$_{13}$ wherein x is a number from 0.7 to 0.95, y is a number from 0.05 to 1 −x, and z is a number from 0.005 to 0.5; and LaMn$_x$Fe$_{2-x}$Ge wherein x is a number from 1.7 to 1.95; or
a Heusler alloy of the MnTP type where T is a transition metal and P is a p-doping metal having an electron count per atom e/a in the range from 7 to 8.5.

* * * * *